(12) United States Patent
Lor et al.

(10) Patent No.: US 8,397,120 B2
(45) Date of Patent: Mar. 12, 2013

(54) METHOD OF ERROR CORRECTION FOR A MULTICAST MESSAGE

(75) Inventors: Kar-Wing Edward Lor, Hong Kong (CN); Soung Liew, Hong Kong (CN); Vincent Wong, Hong Kong (CN)

(73) Assignee: Hong Kong Applied Science and Technology Research Institute Co. Ltd., Shatin, New Territories (HK)

( * ) Notice: Subject to any disclaimer, the term of this patent is extended or adjusted under 35 U.S.C. 154(b) by 457 days.

(21) Appl. No.: 12/638,265

(22) Filed: Dec. 15, 2009

(65) Prior Publication Data

US 2011/0141961 A1   Jun. 16, 2011

(51) Int. Cl.
*H03M 13/00* (2006.01)
(52) U.S. Cl. .......................... 714/751; 714/776
(58) Field of Classification Search .................. 714/751, 714/776
See application file for complete search history.

(56) References Cited

U.S. PATENT DOCUMENTS

| | | | |
|---|---|---|---|
| 6,336,200 B1* | 1/2002 | Wolfgang | 714/752 |
| 6,621,805 B1 | 9/2003 | Kondylis et al. | |
| 6,677,864 B2 | 1/2004 | Khayrallah | |
| 6,721,290 B1 | 4/2004 | Kondylis et al. | |
| 7,386,621 B1 | 6/2008 | Hlasny | |
| 7,447,147 B2 | 11/2008 | Nguyen et al. | |
| 7,542,438 B2 | 6/2009 | Jang et al. | |
| 7,599,294 B2* | 10/2009 | Walsh et al. | 370/235 |
| 7,681,101 B2* | 3/2010 | Oran et al. | 714/748 |
| 7,899,046 B2* | 3/2011 | Ver Steeg | 370/389 |
| 2002/0114283 A1* | 8/2002 | Lee | 370/252 |
| 2002/0152342 A1* | 10/2002 | Das et al. | 710/117 |
| 2004/0078624 A1* | 4/2004 | Maxemchuk et al. | 714/4 |
| 2004/0243901 A1* | 12/2004 | Wang | 714/746 |
| 2007/0258466 A1 | 11/2007 | Kakani | |
| 2007/0268868 A1 | 11/2007 | Singh et al. | |
| 2008/0031179 A1 | 2/2008 | Gao et al. | |
| 2008/0181159 A1 | 7/2008 | Metzler et al. | |
| 2008/0225811 A1 | 9/2008 | Wentink | |
| 2010/0005360 A1* | 1/2010 | Begen et al. | 714/751 |

OTHER PUBLICATIONS

Bonatti et al.; "A Simple Hybrid ARQ-FEC Scheme to Control Errors in the Wireless Link in Wireless ATM Networks".
Barakat et al.; "Analysis of link-level hybrid FEC/ARQ-SR for wireless links and long-lived TCP traffic", *INRIA, Planète research group*, France. pp. 1-19.
Hartanto et al.; "Hybrid Error Control Mechanism for Video Transmission in the Wireless IP Networks".
Rizzo et al.; "RMDP: an FEC-based Reliable Multicast protocol for wireless environments", *Mobile Computing and Comm. Review*, vol. 2, No. 2, pp. 23-31.
Lacan et al.; "Evaluation of Error Control Mechanisms for 802.11b Multicast Transmissions", *LAAS-CNRS & ENSICA*, France.
Basalamah et al.; "Adaptive FEC Reliable Multicast MAC Protocol for WLANs", *IEEEI*, pp. 244-248, (2007).
Li et al.; "IPTV in Multimedia Broadcasting", *IEEE Transactions on Broadcasting*, vol. 55, No. 2, pp. 311-314, (Jun. 2009).
Wu et al.; "IPTV Multicast Over Wireless LAN Using Merged Hybrid ARQ With Staggered Adaptive FEC", *IEEE Transactions on Broadcasting*, vol. 55, No. 2, pp. 363-374, (Jun. 2009).

* cited by examiner

*Primary Examiner* — Philip Guyton
(74) *Attorney, Agent, or Firm* — Leydig, Voit & Mayer, Ltd.

(57) ABSTRACT

A method of error correction for a multicast message sent over a wireless network includes encoding a message into N data packets using a forward error correction code and multicasting at least L data packets of the N data packets over a wireless network to recipients. Recipients not receiving the at least L data packets send a reply to the sender. The sender then selects a second subset of X data packets from the N data packets, and multicasts the X data packets over the wireless network to the recipients.

16 Claims, 2 Drawing Sheets

METHOD OF ERROR CORRECTION FOR A MULTICAST MESSAGE

FIELD OF THE INVENTION

The present invention relates to error correction in communications systems and in particular to error correction in multicast messages send over a wireless network.

BACKGROUND TO THE INVENTION

Service using multicast data transmissions from a single sender to multiple recipients is becoming increasing popular. Often such multicast data transmissions are sent to portable and wireless networking devices operating on public or private infrastructure or adhoc wireless networks, which can often experience a high level of demand and are prone to interference from RF sources resulting in high packet loss rates. Accordingly there is a need for reliable methods of error correction for a multicast message send over wireless networks.

Various error correction techniques are known for ensuring that data is transmitted from a sender to recipient without errors, even across unreliable networks. One common method, known as automatic repeat-request (ARQ) uses an error detection code transmitted with the sent data. The receiver uses the detection code to check for errors, and then requests that the sender retransmits erroneous or missing data. In its most simple form the receiver simply sends an acknowledgement of correctly received data and the sender retransmits anything not acknowledged within a reasonable period of time.

Another well-known error correction technique is channel erasure forward error correction (FEC) in which the date is encoded with redundancy and an error-correcting code (ECC) that enables the recipient to decode the data even if there is erroneous or missing data. The recipient never sends any messages back to the transmitter. The ECC is designed to accommodate the worst-case network conditions. In a channel erasure FEC coding scheme, for example, 100 packets of data are encoded to form 110 packets, which are transmitted over the network. The recipient only needs to receive 100 packets in order to decode the original data, thus the data can be reliably transmitted across a network having a data loss rate of up to 9%.

However, sending multiple unicast transmissions of the same data to multiple recipients or unnecessary redundant data can result in significant computational and network overhead.

SUMMARY OF THE INVENTION

According to a first aspect of the invention there is provided a method of error correction for a multicast message sent over a wireless network, comprising encoding a message into N data packets using a forward error correction code such that a subset L of the N data packets is needed to decode the message, multicasting at least L of the N data packets over a wireless network to a plurality of recipients, receiving a reply from at least one recipient not receiving at least L data packets, selecting a second subset of X data packets from the N data packets, and multicasting the X data packets over the wireless network to the plurality of recipients.

The method may further comprise receiving a subsequent reply from at least one recipient that has not received at least L data packets, and selecting a subsequent subset of Xs data packets from the N data packets, multicasting the Xs data packets over the wireless network to the plurality of recipients, and repeating the receiving, selecting and multicasting steps until all recipients have received L data packets or until all N data packets have been multicast to the recipients.

When all N data packets have been multicast to the recipients, the method includes receiving a subsequent reply from at least one recipient that has not received at least L data packets and unicasting missing data packet to the recipient until said recipient has received L data packets. Missing data packets are selected from the N data packets multicast to the plurality of recipients and not received by the recipient.

The reply from the recipient includes a list of packets that the recipient has received and may use Transmission Control Protocol.

Encoding a message into N data packets uses a channel erasure coding method.

Multicasting the at least L data packets comprises multicasting L data packets+K data packets, where L+K<N, where K is an arbitrary number greater than or equal to 0 and less than or equal to N−L.

Selecting a second subset of X data packets comprises calculating a number J data packets that the recipient still needs to receive, where J=L−H and H is the number of data packets received by the recipient, and selecting X data packets from the N data packets such that X≧T. The X data packets are selected from the N data packets that have not previously been multicast to the plurality of recipients.

Alternatively, selecting X data packets from the N data packets comprises selecting X such that X=J×R, where R is a redundancy factor greater than or equal to 1, where R is in a range from 1 to (N−L)/J, such that X is in a range from J to (N−L).

The method may also comprises receiving a reply from at least one recipient comprises receiving a reply from two recipients, and selecting a second subset of X data packets comprises calculating a number J for each recipient where J=L−H and H is the number of data packets received by each of the recipients respectively, and selecting X data packets from the N data packets such that X=Jm×R, where Jm is the largest J calculated for the two recipients and R is a redundancy factor greater than or equal to 1

According to a second aspect of the invention there is provided a method of error correction for a multicast message sent over a wireless network, comprising encoding a message into N data packets using a forward error correction code, wherein the block of N data packets comprises at least L data packets needed to decode the message, selecting a first group of M data packets from the block of N data packets, wherein M is in a range from L to N, multicasting the first group of M data packets over a wireless network to a plurality of recipients, receiving a reply from at least one recipient, the reply comprising information on a number H of the multicast data packets received by the recipient, selecting a second group of X data packets from the block of N data packets, wherein X is in a range from J to S, where J=L−H the number of data packets that the recipient still needs to receive to decode the message, and S=N−M, and multicasting the second group of X data packets over the wireless network to the plurality of recipients.

The block of N data packets is encoded using channel erasure coding with the L data packets needed to decode the message and with S temporal redundant data packets such that N=L+S.

Preferably, M is a minimum of L/(1−E) or N, where E is an estimated unitized packet loss probability in a range of 0 to 1.

The method may further comprises calculating a unitized packet loss probability P for the wireless network where P=G/M and G is the number of lost packets M−H, and wherein selecting a second group of X data packets from the block of N data packets comprises selecting X data packets from the N data packets such that X=J×(1/(1−P)).

Receiving a reply from at least one recipient comprises receiving replies from a plurality of recipients, and calculating P comprises calculating an average P for all recipients, and where J is a maximum J for all recipients.

Selecting a second group of X data packets from the block of N data packets comprises selecting X data packets from the N data packets such that X=min(S, Jmax×((1/(1−P)+r)) where r is a redundancy factor greater than or equal to 0.

The method may further comprise receiving a subsequent reply from at least one recipient that has not received at least L data packets, and selecting a subsequent subset of Xs data packets from the N data packets, multicasting the Xs data packets over the wireless network to the plurality of recipients, and repeating the receiving, selecting and multicasting steps until all recipients have received L data packets or until all N data packets have been multicast to the recipients.

The method may further comprise receiving a subsequent reply from at least one recipient that has not received at least L data packets, determining whether it is more efficient to use multicast selecting a subsequent subset of Xs data packets from the N data packets, multicasting the Xs data packets over the wireless network to the plurality of recipients, and repeating the receiving, selecting and multicasting steps until all recipients have received L data packets or until all N data packets have been multicast to the recipients.

When all N data packets have been multicast to the recipients, receiving a subsequent reply from at least one recipient that has not received at least L data packets and unicasting missing data packet to the recipient until said recipient has received L data packets.

The method may further comprise receiving a subsequent reply from at least one recipient that has not received at least L data packets, determining whether it is more efficient to use multicast selecting a subsequent subset of Xs data packets from the N data packets, multicasting the Xs data packets over the wireless network to the plurality of recipients, repeating the receiving, selecting and multicasting steps until only one recipient has not received L data packets and unicasting missing data packet to the one recipient until said recipient has received L data packets.

The method may further comprise receiving a subsequent reply from at least one recipient that has not received at least L data packets, determining whether it is more efficient to use multicast selecting a subsequent subset of Xs data packets from the N data packets, multicasting the Xs data packets over the wireless network to the plurality of recipients, repeating the receiving, selecting and multicasting steps until Ou<Om, where Ou=(N−H)·Tu for all recipients still have fewer than L packets, Om=X·Tm where Tu is the unicast time per packet and Tm is the multicast time per data packet, and unicasting missing data packet to the recipients until all recipients have received L data packets.

Multicasting the data packets over a wireless network comprises transmitting the data packets at a first transmission rate B1, the method further includes calculating a unitized packet loss probability P for the wireless network where P=G/M and G is the number of lost packets M−H, and transmitting subsequent data packets at a lower transmission rate B2 when P>(1−(B1/B2)).

The reply from the recipient includes a list of packets that the recipient has received and may use Transmission Control Protocol.

Encoding a message into N data packets uses a channel erasure coding method.

Further aspects of the invention will become apparent from the following description and drawings which are given by way of example only to illustrate the invention.

BRIEF DESCRIPTION OF THE DRAWINGS

The invention will now be described with reference to the accompanying drawings in which.

DESCRIPTION OF THE EXEMPLARY EMBODIMENTS

Figure 1:
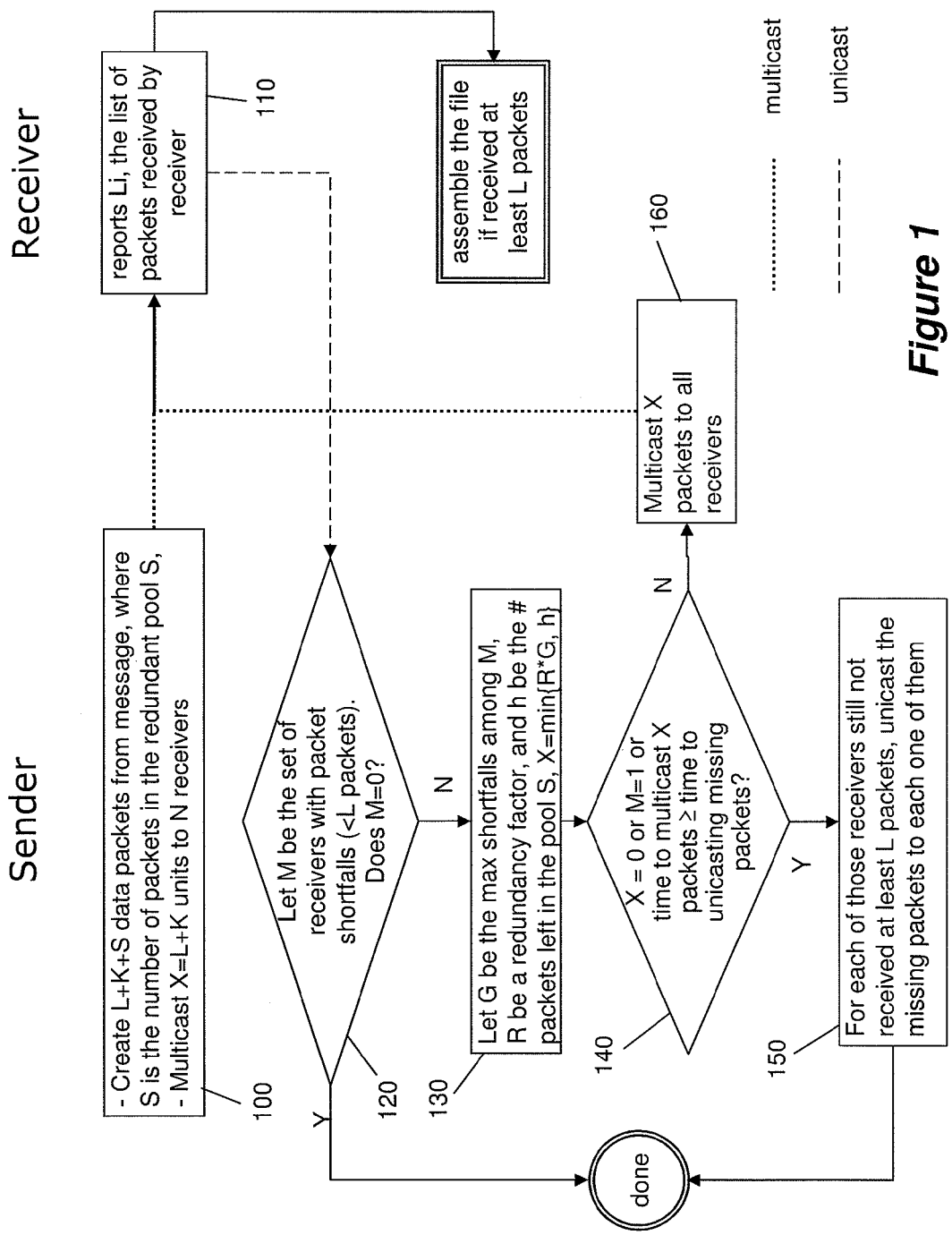
FIG. 1 is a schematic flow diagram of a first preferred method according to the invention.

Before any embodiments of the invention are explained in detail, it is to be understood that the invention is not limited in its application to the details or arrangements set forth in the following description or illustrated in the drawings. The invention is capable of other embodiments and of being practiced or of being carried out in various ways. Also, it is to be understood that the phraseology and terminology used is for the purpose of description only and should not be regarded as limiting.

In this description and claims the term unicast means a data transmission sent to a single recipient and the term multicast means a data transmission sent from a single sender to a plurality of known or predetermined recipients. The term multicast should be distinguished from broadcast, which in this document should be understood to mean a data transmission sent from a single sender to generally unknown or an unknown number of recipients. The term message means any data, string of data, file, or information of any nature transmitted between a sender and a recipient or recipients via a communications network.

The invention provides generally an adaptive hybrid forward error correction (FEC)/automatic repeat request (ARQ) method of error correction for use in sending a multicast message sent over a wireless network. The method provides for a multicast message to be sent from a sender to a plurality of known recipients via a wireless network. The message is initially sent by multicasting the data as a sequence of data packets encoded using a channel erasure FEC coding method. In the preferred embodiment the message is encoded using a channel erasure coding with redundant data packets such that the recipients can decode the message without error if only some of the packets are lost or have errors. Such FEC encoding methods are well known in the art. In the current invention the FEC method is used to encode the message into two blocks of data packets. The first block of data packets contains at least L data packets, which is the minimum number of packets the must be received by a recipient without error in order for the recipient to decode the message. In a preferred embodiment the first block of data packets may also contain a number of first temporal redundant packets. The second block of data packets contains a second group of temporal redundant packets. The temporal redundant packets are back-up packets that are either not sent or are sent and discarded by the recipient unless one or more multicast packets are lost or received with errors. In the first multicast only packets from the first bock of data packets are sent to recipients. In the preferred embodiment the number of packets sent in the first multicast is L, the minimum number of packets that must be received to decode the message, plus a number of redundant packets which is based on a known or predicted packet loss probability.

After a first multicast transmission of the message recipients send an acknowledgement report back to the sender, using a reliable unicast means such as the Transmission Control Protocol (TCP), reporting the number of packets received during the multicast. The acknowledgement report preferably contains a list of the packets that have been received. In the preferred embodiment a recipient only sends an acknowledgement to the sender if the recipient has not received sufficient error free packets to successfully decode the message. Thus, failure of a particular recipient to send an acknowledgement to the sender within a set time frame is an implied acknowledgement that the recipient has received the entire message without error.

After the sender has waited for the set time frame after the last packet in the multicast was sent one of three options are possible. Firstly, if no acknowledgements have been received from recipients, or in some embodiments acknowledgements are received to indicate successful receipt of the message, the message multicast can end because all intended recipients are assumed to have successfully received the message without error. Secondly, if certain criteria are met then the sender will switch to an ARQ type error correction method and unicast each recipient one by one, using a reliable transmission means like TCP, the missing data packets that it needs to successfully decode the message. The criteria for switching to the ARQ will be described later. Thirdly, the sender can send a further sequence of packets encoded by the FEC method to the plurality of recipients using a multicast. The number of packets sent in the second multicast is dynamically adapted based on the number of packets the worst-case recipient needs in order to successfully decode the message as determined from the recipient acknowledgements. The sender continues to iteratively multicast further sequence of packets until the first or second options above are true. In each multicast the number of packets sent is dynamically adapted based on the number of packets needed by the recipients to successfully decode the message. Packets for the second and subsequent multicasts are selected from the second block of encoded packets.

In one embodiment of the invention the number of packets X sent in second and subsequent multicasts is based on the maximum number of packets J that any one recipient needs to receive in order to have the required L packets plus a redundancy factor R, or a packet loss probability P, which is estimated for the very first time of the multicast transmission but calculated in subsequent times. Each recipient that has not received L packets sends an acknowledgement reply to the sender that indicates which or how many error free packets have been received. The maximum number of packets Jmax that any one recipient needs to receive is give by Jmax=L−Hmin, where L is the minimum number of packets that must be received by a recipient without error in order for the recipient to decode the message and Hmin is the minimum number of packets reported as being received by any one recipient. Using R, number of packets send in second and subsequent multicasts is calculated as X=J×R. In the preferred embodiment R is simply calculated as an arbitrary number in the range of 1 to S/J, where S is the number of packets in the second block of data packets contains a second group of temporal redundant packets, in order to account for packet loss in the network. When R=1 then X=J and when R=S/J then X=S. By way of example, if an anticipated packet loss is between 3 and 8 percent then R may be chosen as, say, 1.1 in order to add a redundancy of 10 percent to the number of transmitted packets. For example, say, L=1000, H=900, and unitized packet loss probability is 0.2 (20%) then X=(1000−900)×1.1=110 packets.

Alternatively X is calculated using a packet loss probability P using the formula X=min(S, Jmax×((1/(1−P)+r)), where P is a unitized packet loss probability less than 1. The number of packets X sent in second and subsequent multicasts is based on the maximum number of packets Jmax that any one recipient needs to receive in order to have the required L packets plus the average packet loss probability P calculated from the last multicast, which is give by Pave=Gave/N, where Gave=sum(N−Hi)/n and N is the number of packets send in the last multicast, Hi is the number of packets received by the ith recipient and n is the number of recipients i. A redundancy factor r is added and can be a value greater than zero. By way of example, if the number of packets N sent in the first multicast is 1100 and four recipient acknowledge receipt of 1125, 1175, 1150 and 1150 packets respectively then Gave=(75+25+50+50)/4=50 and P=50/1100=0.045 (4.5%). Take r as, say, 0.03. Calculating X from the previous example gives X=(1000−900)×(1/(1−0.045)+0.03)=108 packets.

The number of packets X is recalculated before each successive multicast and the packets are selected from the second block of encoded packets, or all recipients have received L packets.

The method switches to an ARQ unicast method at any iteration of the multicast if the following criteria are present. Firstly, all of the packets in the second block of encoded packets have been sent to recipients—that is, the second block of encoded packets is exhausted. Secondly, if only 1 recipient reports having not received L packets. Thirdly, if the overhead of sending a multicast transmission is greater than the overhead of sending two or more unicast transmissions. Further explanation is given below.

The method will switch from multicast to unicast if all of the packets in the second block of encoded packets have been sent to recipients. In each second and subsequent iteration of the multicast a discreet subset of the second block of encoded packets is selected and sent to the recipients. Once sufficient multicasts have been made such that the entire second block of packets has been selected and multicast to recipients then the method will switch to unicast method in which recipients are sent a missing packet until each recipient has the L number of required packets in order to decode the message. The acknowledgement report from each recipient may be in the form of a list of received packets. From this report the sender is able to determine which specific packets the recipient is missing and sends the recipient a sufficient number of those missing packets via unicast until the recipient has the required L number of packets in order to decode the message. The sender does this for each recipient that still does not have L packets until each recipient has L packets.

If all recipients have received L packets then the method stops. However, if after any multicast only one recipient reports having not received L packets then the method switches to a unicast method and the sender sends that recipient only missing packets via unicast until the recipient has the sufficient number of L packets to decode the message.

At each iteration of the method the sender may also calculate the transmission overhead comparison between multicasting X packets to a plurality of recipients or to unicasting only missing packets to recipients one by one. It does this by determining, or referencing a predetermined, transmission time per data packet using a unicast mode and a multicast mode. It can then use these two weighting in order to determine whether unicast or multicast method should be used. Unicast is used if Ou<Om, where Ou=sum(N−Hi)·u, Om=X·Tm, Tu is the unicast time per packet and Tm is the broadcast time per data packet.

In a preferred embodiment of the invention the sender might also try and mitigate the number of loss packets in a multicast or unicast transmission by lowering the transmission data rate. Predetermined criteria can be set for triggering and lowering of transmission data rate. For example, a lower data transmission rate may be used where $P>(1-(B1/B2))$ where B1 is a first transmission rate and B2 is the next lowest transmission rate.

Figure 2:
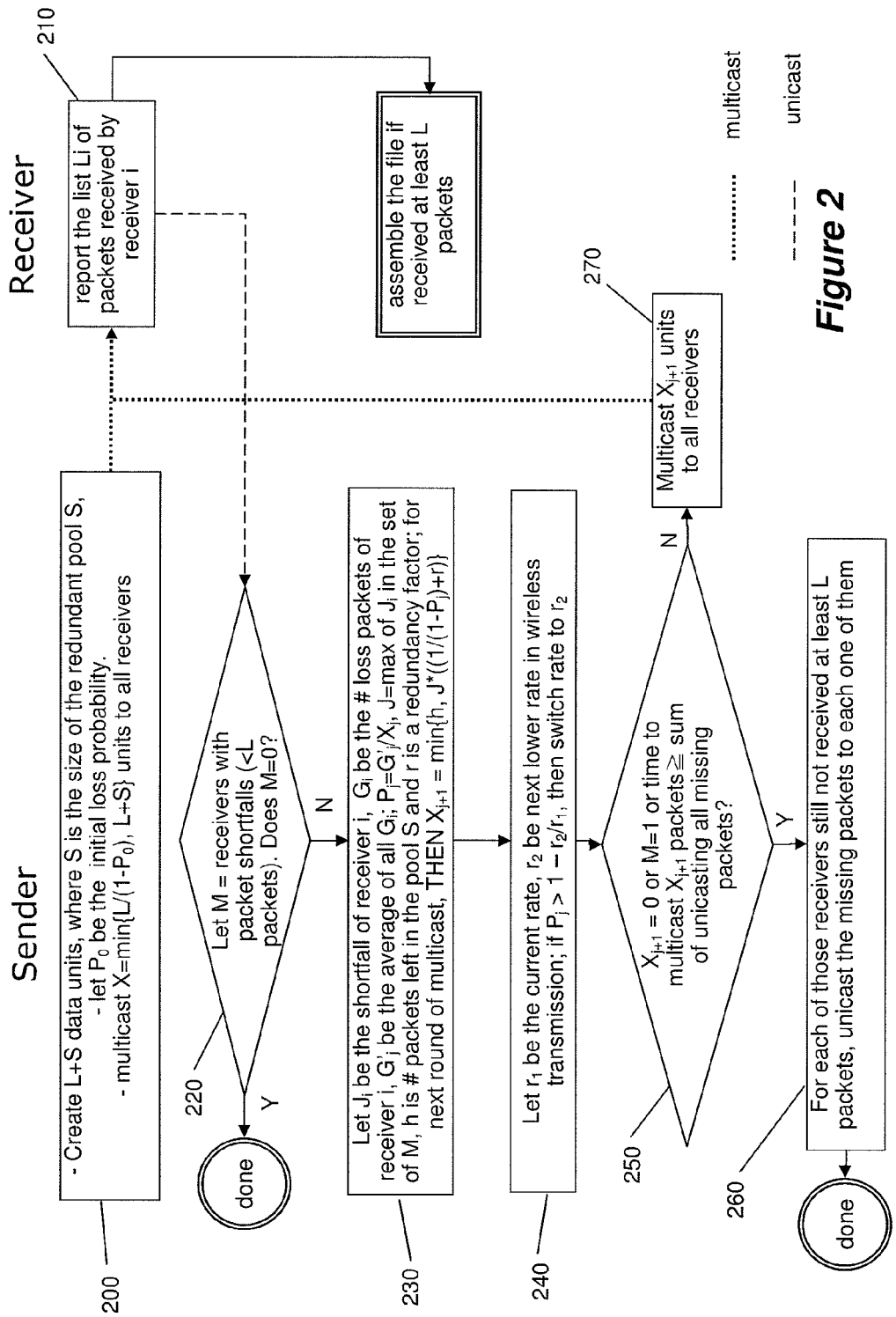
FIG. 2 is a schematic flow diagram of a first preferred method according to the invention.

Two specific examples of preferred embodiments of the invention are given in FIGS. 1 and 2. Referring to FIG. 1, at process block 100 the sender creates a three blocks of data packets L+K+S from a message using a channel erasure forward error correction code, such that L data packets are required to decode the message at the receiver end. The K data packets is a first set of redundant packets and S is a second block of redundant packets. The sender multicasts the blocks of packets L+K to the receivers.

At block 110 each receiver generates a report comprising Li which is a list of the packets received by the receiver. The report is unicast back to the sender. At block 120 the sender creates a set M of receivers with packet shortfalls (that is to say receivers with less than L packets). If the set M has no members (M=0) then all receivers have received L packets and so the method is done.

If M has one or more members than the method moves to block 130 and the sender calculates G which is the maximum shortfall of any of the members of set M. The sender then calculates a number of packets which should be sent in the second multicast using the formula X=min{R*G,h}, where R is a redundancy factor greater than 1 and h is the packets remaining in pool S.

In decision block 140 the sender decides whether an X=0 (h=0 indicating that all of the redundant packets in pool S are used up) or M=1 (there is only one receiver that has received less than L packets) or the time to multicast X packets is greater than or equal to the time to unicast missing packets to each receiver one by one. If any of these conditions are true then the sender unicasts missing packets to the receivers one by one—block 150. If all of the conditions are false then the sender multicasts the X data packets to all receivers—block 160.

After the second multicast the receivers again generates a report comprising a list of packets received by the receiver and unicast this back to the sender. The method repeats from process block 120 until all receivers have received at least L packets such that M=0 and the method is done.

Referring to FIG. 2, at block 200 the sender uses a channel erasure error correction code in order to create L+S blocks of data packets where L is a number of data packets needed to decode the message and S is a redundant pool of data packets. The sender then determines $P_o$ an initial loss probability for the network. This can be a calculated from a recent transmission or may be a predetermined probability. The sender then determines how many packets X which must be multicast to all receivers based on the loss probability using the formula $X=\min\{L/(1-P_0), L+S\}$. If the loss probability is 0 then X=L or if the loss probability is 1 then X=L+S. The X data packets are multicast to all receivers.

At block 210 each receiver generates a report comprising Li which is a list of the packets received by the receiver. The report is unicast back to the sender. At block 120 the sender creates a set M of receivers with packet shortfalls (that is to say receivers with less than L packets). If the set M has no members (M=0) then all receivers have received L packets and so the method is done.

If M has one or more members than the method moves to block 230. The sender calculates the shortfall in packets J for each receiver (where J=L−number of packets received by the receiver) and the total number of lost packets G for each receiver (where G=X−the number of packets received by the receiver). The sender then calculates the average loss probability Pj for the first multicast and the maximum J amongst all the receivers. From these values the number of packets X and the next multicast can be calculated according to the formula X=min{h, J*((1/(1−Pj))+r)}

At decision block 240 the sender determines whether to reduce the data transmission rate based on the formula P.

In decision block 250 the sender decides whether an X=0 (h=0 indicating that all of the redundant packets in pool S are used up) or M=1 (there is only one receiver that has received less than L packets) or the time to multicast X packets is greater than or equal to the time to unicast missing packets to each receiver one by one. If any of these conditions are true then the sender unicasts missing packets to the receivers one by one—block 260. If all of the conditions are false then the sender multicasts the X data packets to all receivers—block 270.

After the second multicast the receivers again generates a report comprising a list of packets received by the receiver and unicast this back to the sender. The method repeats from process block 220 until all receivers have received at least L packets such that M=0 and the method is done.

What is claimed is:

1. A method of error correction for a multicast message sent over a wireless network, the method comprising:
   encoding a message into N data packets using a forward error correction code such that a subset of L data packets of the N data packets is needed to decode the message;
   multicasting at least K (where N>K≧L) data packets of the N data packets over the wireless network to a plurality of recipients;
   receiving a first reply from at least one recipient not receiving at least L data packets;
   selecting a second subset of X data packets from the N data packets by
      calculating a number J of data packets that the at least one recipient still needs to receive, where J=L−H and H is the number of data packets received among all recipients, and
      selecting X data packets from the N data packets such that X≧J, wherein X is selected such that X=J×R, where R is a redundancy factor and in a range from 1 to (N−L)/J, and X is in a range from J to (N−L); and
   multicasting the X data packets over the wireless network to the plurality of recipients.

2. A method of error correction for a multicast message sent over a wireless network, the method comprising:
   encoding a message into N data packets using a forward error correction code, wherein the N data packets comprise at least L data packets needed to decode the message;
   selecting a first group of M data packets from the N data packets, wherein
      M is determined from L plus a number of redundant data packets related to a first packet loss probability, and
      M is in a range from L to N;
   multicasting the first group of M data packets over a wireless network to a plurality of recipients;
   receiving a first reply from at least one recipient, the reply comprising information on a number H of the first group of M data packets that have been multicast and received by the recipient;

selecting a second group of X data packets from the N data packets using a second packet loss probability, wherein X is in a range from J to S, where J=L−H and is the number of data packets that the recipient still needs to receive to decode the message, and S=N−M; and multicasting the second group of X data packets over the wireless network to the plurality of recipients, wherein M is the smaller of L/(1−E) and N, where E is an estimated unitized packet loss probability in a range from 0 to 1.

3. The method of claim 2 further including:

receiving a second reply from at least one recipient that has not received the at least L data packets;

selecting a subset of Xs data packets from the N data packets;

multicasting the Xs data packets over the wireless network to the plurality of recipients; and repeating the receiving, selecting, and multicasting until all recipients have received the L data packets or until all N data packets have been multicast to the recipients.

4. The method of claim 3 wherein all N data packets have been multicast to the recipients, and further including:

receiving a further reply from the at least one recipient that has not received the at least L data packets; and unicasting missing data packets to the at least one recipient until the at least one recipient has received the L data packets.

5. The method of claim 2 further including:

receiving a second reply from the at least one recipient that has not received the at least L data packets;

selecting a subset of Xs data packets from the N data packets;

multicasting the Xs data packets over the wireless network to the plurality of recipients;

repeating the receiving, selecting, and multicasting until only one recipient has not received the L data packets; and unicasting missing data packets to the one recipient until the one recipient has received L data packets.

6. The method of claim 2 wherein the first reply from the at least one recipient includes a list of packets that the at least one recipient has received.

7. The method of claim 6 including selecting missing data packets from the N data packets multicast to the plurality of recipients and not received by the at least one recipient.

8. The method of claim 2 wherein the first reply from the at least one recipient uses Transmission Control Protocol.

9. The method of claim 2 including encoding a message into N data packets using a channel erasure coding method.

10. The method of claim 2 including multicasting the first group of M data packets at a first wireless transmission rate and multicasting the second group of X data packets at a second wireless transmission rate, wherein the first and second wireless transmission rates are different.

11. A method of error correction for a multicast message sent over a wireless network, the method comprising:

encoding a message into N data packets using a forward error correction code, wherein the N data packets comprise at least L data packets needed to decode the message;

selecting a first group of M data packets from the N data packets, wherein
M is determined from L plus a number of redundant data packets related to a first packet loss probability, and
M is in a range from L to N;

multicasting the first group of M data packets over a wireless network to a plurality of recipients;

receiving a first reply from at least one recipient, the reply comprising information on a number H of the first group of M data packets that have been multicast and received by the recipient;

selecting a second group of X data packets from the N data packets using a second packet loss probability, wherein X is in a range from J to S, where J=L−H and is the number of data packets that the recipient still needs to receive to decode the message, and S=N−M;

multicasting the second group of X data packets over the wireless network to the plurality of recipients; and calculating a unitized packet loss probability P for the wireless network, where P=G/M and G is number of lost packets, M−H, and wherein selecting a second group of X data packets from the N data packets comprises selecting X data packets from the N data packets such that $X = J \times (1/(1-P))$.

12. The method of claim 11 wherein receiving a first reply from the at least one recipient comprises receiving replies from a plurality of recipients, calculating P comprises calculating an average P for all recipients, and determining a J value for each of the recipients and J is the maximum of all of the J values determined.

13. The method of claim 11 including selecting a second group of X data packets from the N data packets such that $X = \min(S, J_{max} \times ((1/(1-P))+r))$, where r is a redundancy factor and at least 0, and Jmax is the maximum of all of the J values determined for all recipients.

14. A method of error correction for a multicast message sent over a wireless network, the method comprising:

encoding a message into N data packets using a forward error correction code, wherein the N data packets comprise at least L data packets needed to decode the message;

selecting a first group of M data packets from the N data packets, wherein
M is determined from L plus a number of redundant data packets related to a first packet loss probability, and
M is in a range from L to N;

multicasting the first group of M data packets over a wireless network to a plurality of recipients;

receiving a first reply from at least one recipient, the reply comprising information on a number H of the first group of M data packets that have been multicast and received by the recipient;

selecting a second group of X data packets from the N data packets using a second packet loss probability, wherein X is in a range from J to S, where J=L−H and is the number of data packets that the recipient still needs to receive to decode the message, and S=N−M;

multicasting the second group of X data packets over the wireless network to the plurality of recipients;

receiving a second reply from at least one recipient that has not received the at least L data packets;

selecting a subset of Xs data packets from the N data packets;

multicasting the Xs data packets over the wireless network to the plurality of recipients;

repeating the receiving, selecting, and multicasting until $O_u < O_m$, where $O_u = (N-H) \cdot T_u$ for all recipients that still have received fewer than L packets, and $O_m = X \cdot T_m$, where Tu is the unicast time per data packet and Tm is the multicast time per data packet; and unicasting missing data packets to the plurality of recipients until all recipients have received the L data packets.

15. A method of error correction for a multicast message sent over a wireless network, the method comprising:
- encoding a message into N data packets using a forward error correction code, wherein the N data packets comprise at least L data packets needed to decode the message;
- selecting a first group of M data packets from the N data packets, wherein
  - M is determined from L plus a number of redundant data packets related to a first packet loss probability, and
  - M is in a range from L to N;
- multicasting the first group of M data packets over a wireless network to a plurality of recipients;
- receiving a first reply from at least one recipient, the reply comprising information on a number H of the first group of M data packets that have been multicast and received by the recipient;
- selecting a second group of X data packets from the N data packets using a second packet loss probability, wherein X is in a range from J to S, where J=L−H and is the number of data packets that the recipient still needs to receive to decode the message, and S=N−M; and
- multicasting the second group of X data packets over the wireless network to the plurality of recipients, wherein multicasting the data packets over a wireless network comprises transmitting the data packets at a first transmission rate, B1, and further comprising:
- calculating a unitized packet loss probability, P, for the wireless network, where P=G/M, and G is number of lost packets, M−H; and
- subsequently transmitting data packets at a lower transmission rate, B2, when P>(1−(B1/B2)).

16. The method of claim 15 where calculating P comprises calculating an average P for all recipients.

* * * * *